United States Patent
Berthiaud et al.

(10) Patent No.: US 9,501,910 B2
(45) Date of Patent: Nov. 22, 2016

(54) PAYMENT TERMINAL WITH INSERTION SLOT PARALLEL TO TERMINAL POSITION SURFACE

(71) Applicant: INGENICO GROUP, Paris (FR)

(72) Inventors: Olivier Berthiaud, Cornas (FR); Jerome Andre, Montoison (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/931,394

(22) Filed: Nov. 3, 2015

(65) Prior Publication Data
US 2016/0125703 A1 May 5, 2016

(30) Foreign Application Priority Data
Nov. 3, 2014 (FR) ...................................... 14 60592

(51) Int. Cl.
*G07G 1/00* (2006.01)
*G06K 7/08* (2006.01)
*G07G 1/01* (2006.01)
*G07G 1/12* (2006.01)

(52) U.S. Cl.
CPC ............. *G07G 1/0018* (2013.01); *G06K 7/084* (2013.01); *G07G 1/01* (2013.01); *G07G 1/12* (2013.01)

(58) Field of Classification Search
CPC ............................ G07G 1/0018; G06K 7/084
USPC ........................................................ 235/380
See application file for complete search history.

(56) References Cited

U.S. PATENT DOCUMENTS

| | | | |
|---|---|---|---|
| D372,730 S | 8/1996 | Sasaki | |
| 6,202,055 B1* | 3/2001 | Houvener | G06Q 20/04 705/44 |
| 6,373,511 B1* | 4/2002 | Groves | B41J 3/36 347/198 |
| 7,451,917 B2* | 11/2008 | McCall | G06Q 20/00 235/379 |
| 8,025,219 B2* | 9/2011 | Henry | G06K 7/0004 235/380 |
| 2011/0238581 A1* | 9/2011 | Severson | G06Q 20/04 705/67 |
| 2012/0018288 A1* | 1/2012 | Rollet | G06F 21/83 200/5 A |

FOREIGN PATENT DOCUMENTS

EP 2101280 A1 * 9/2009 ............. G06K 7/084

OTHER PUBLICATIONS

French Search Report and Written Opinion dated Jul. 14, 2015 for French Application No. 14/060592, filed Nov. 3, 2014.
"MX900 Series Reference Manual", Verifone Inc., Sep. 14, 2012, p. 66PP, XP055201702.
"Notice terminal lecteur carte magnetique", Dec. 22, 2000, XP055202058.
Notice design terminal lecteur carte magnetique:, Jun. 30, 1982, XP055202059.
English Translation of the Written Opinion dated Jul. 14, 2015 for French Application No. 14/060592 filed Nov. 3, 2014.

* cited by examiner

*Primary Examiner* — Toan Ly
(74) *Attorney, Agent, or Firm* — David D. Brush; Westman, Champlin & Koehler, P.A.

(57) ABSTRACT

A payment terminal includes a slot for inserting a magnetic memory card. A general display plane of the terminal, formed by a keyboard and/or a terminal screen, forms a non-zero angle with a general positioning surface of the terminal. The bottom plane of the insertion slot of a magnetic memory card is appreciably parallel to the plane on which the terminal is positioned.

3 Claims, 2 Drawing Sheets

PAYMENT TERMINAL WITH INSERTION SLOT PARALLEL TO TERMINAL POSITION SURFACE

1. FIELD OF THE DISCLOSURE

The present disclosure relates to the field of payment terminals. The disclosure relates more particularly to the field of payment terminals having a magnetic memory card reader. A payment terminal is a device that can be used to make through a payment means. Present-day terminals are often called multi-mode terminals because they accept several types of payment means: memory cards, contactless cards or again communications terminals working in contactless mode.

Memory cards comprise at least two different types of memory: chip-based memory cards which are commonly found in Europe and magnetic memory cards with are commonly found in the United States. It can also be noted that Europe also has a non-negligible proportion of multi-mode cards: such cards comprise both a magnetic stripe, generally on the back of the card, according to the ISO 7811 standard, and a chip positioned on the front face of the memory card.

The payment terminal for its part often has several readers to interact with these payment cards: a reader for chip-based memory cards and a reader for magnetic memory cards reader used to read a magnetic stripe.

2. PRIOR ART

A payment terminal comprises means for reading a magnetic memory card. To this end, the terminal is provided with a groove or slot that is situated either on the side of the terminal or above the screen. This slot serves for the insertion of the card and makes the magnetic stripe in the card pass before a magnetic head so that the information contained in the card can be read by the payment terminal. The user inserts the card into this slot and conveys a translational motion to the card so that the magnetic track gets shifted before the magnetic head of the payment terminal. Terminals with a slot above the screen are tending to go out of use. These terminals are rather old and bulky. In an approach towards compactness, present-day terminals tend to have the insertion slot on the side. Such an architecture is described with reference to FIGS. 1, 2 and 3 representing an example of a payment terminal. These figures are naturally not exhaustive as regards the scope of the present disclosure and serve only to expose a state of the prior art. In this example, a payment terminal (10) is a device comprising a rigid casing (for example made of injected plastic). In this example, the terminal comprises a housing (11) for a paper roll of a printer. It also comprises a pin-code mask (or pin-pad cover) (12). This pin-code mask is used to mask the entering of a confidential code. In the example described, it can also be noted that the housing (11) for a paper roll enables the creation of an angle of tilt of the terminal when it is placed on a horizontal support. In this example, the terminal tilts at about 5° to 15°. The tilt of the terminal is measured relative to the general display plane formed by the keypad and/or the screen of the terminal (PIT). This tilt is not the result of chance: it enables the user to better distinguish what is displayed on the screen of the terminal (13) and it makes it possible to see and use the keyboard more efficiently. Besides, in other payment terminals that do not have this housing (11) for a paper roll, complementary raising legs can be added at the position of the housing (11) for a paper roll in order to offer a same angle of tilt.

As is shown in FIGS. 1 and 2, the card (14) follows a translational motion in a slot (this is a slot, the two vertical walls of which are very large in size so as to ensure the stability of the card and the uniformity of its translational motion). The magnetic tracks of the card (15) can then be read by a magnetic head (16). The card rests on the bottom (17) of the slot. The bottom (17) of this slot is therefore also inclined by an angle that is more or less identical to the angle of tilt of the terminal (i.e. between 5° and 10° in this example). In these figures, the plane of tilt of the terminal (PIT) and the bottom (17) of the slot are not parallel.

This raises two problems: the first problem relates to the fact that the translational motion is made more difficult. It is indeed more difficult to carry out a translational motion on a tilted surface because at the same time as this translation is made, it is necessary to press downwards, and this is not a very natural gesture.

The second problem relates to the obstruction made against the movement: indeed, the presence of the pin-code mask prevents the translational motion from being made correctly. Indeed, when the card is grasped, there is tendency rather to grasp it right in the middle so as to preserve the right balance. In so doing, since the space situated between the card and the side wall of the pin-code mask is not sufficient for a finger, it is not possible to carry out the motion up to the end. The finger (for example the thumb, when the slot is situated on the right-hand side of the terminal as is almost always the case) is obstructed. This means that either the transaction is a failure and the card has to be passed through again or, during the translation motion, the position of the fingers has to be adjusted so as not to strike the pin-code mask.

3. SUMMARY

A payment terminal is disclosed comprising a slot for inserting a magnetic memory card. According to the present disclosure, such a terminal is characterized by the fact that the bottom plane or bottom surface of the insertion slot of a magnetic memory card is substantially parallel to the plane on which the terminal is placed.

In other words, the bottom plane of the insertion slot of a magnetic memory card is shaped that that it has an angle that is appreciably the reverse of the angle of tilt of the payment terminal (whether this angle is due to the presence of a housing for a paper roll of a printer, or that of the tilting legs of the terminal).

More particularly, a payment terminal is disclosed comprising a slot for inserting a magnetic memory card, a general display plane of which, formed by a keyboard and/or a terminal screen, forms a non-zero angle with a general positioning surface or supporting surface of said terminal.

The terminal is characterized by the fact that the bottom plane of the insertion slot of a magnetic memory card is substantially parallel to the plane on which the terminal is positioned.

According to one particular embodiment, the bottom plane of the insertion slot forms an angle of 0° to 5° with the general display plane.

Thus, through this configuration, the translational motion is facilitated. Indeed, it is no longer necessary to press the card so that it perfectly follows the angle of tilt of the bottom of the slot because this angle of tilt is zero.

According to one particular characteristic, the height of the slot relative to the plane on which the terminal is positioned is designed so that fingers holding the card during its translational motion do not come into contact with the pin-code mask of the terminal. Thus, the user is free to hold the card as he wishes.

4. FIGURES

Other features and advantages shall appear more clearly from the following description of a particular embodiment of the disclosure, given by way of simple, illustrative and non-exhaustive examples and from the appended figures, of which:

FIG. 1, already commented upon, is a side view of a prior-art payment terminal in which the card, the bottom of the slot and the magnetic head are represented by dotted lines;

FIG. 2, already commented upon, is a side view of a prior-art payment terminal in which the card is being translated in the slot;

FIG. 3 schematically represents a front face of a terminal according to FIGS. 1 and 2;

5. DESCRIPTION OF AN EMBODIMENT

Figure 1:
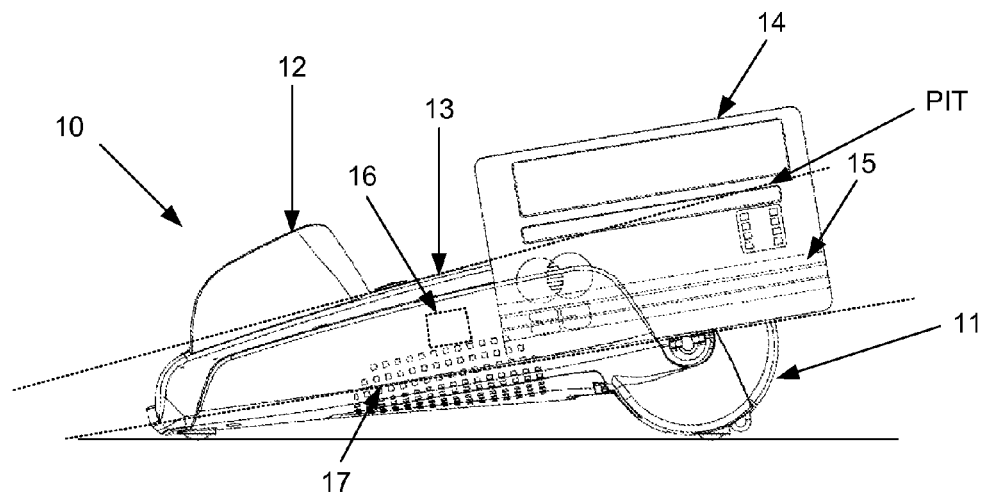
Figure 2:
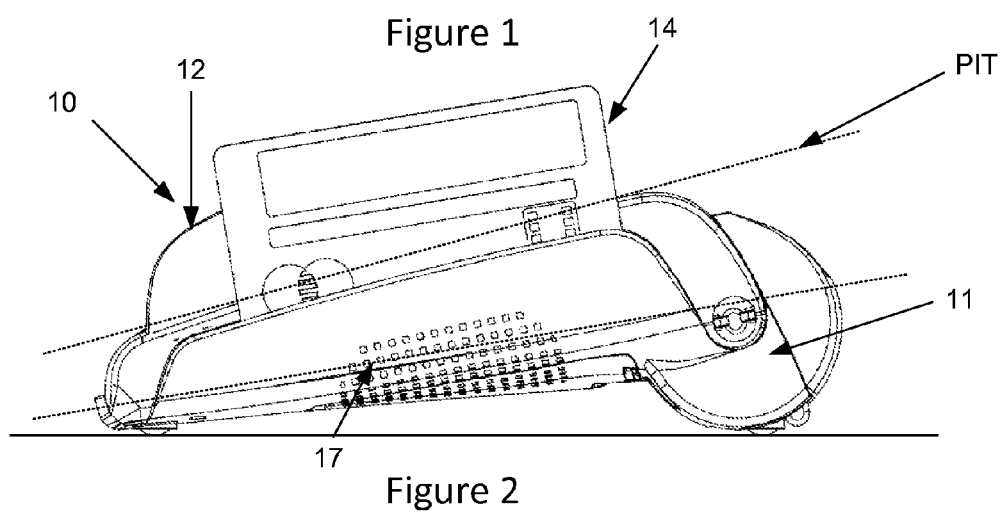
Figure 3:
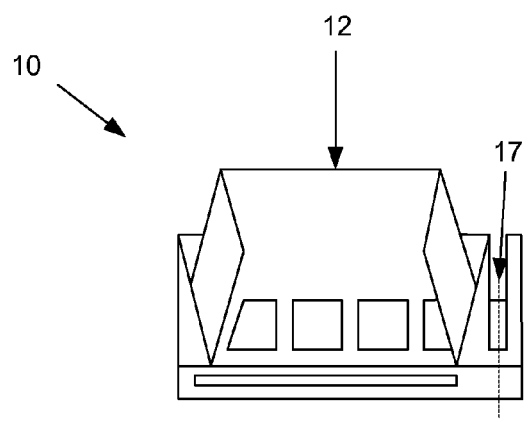
Figure 4:
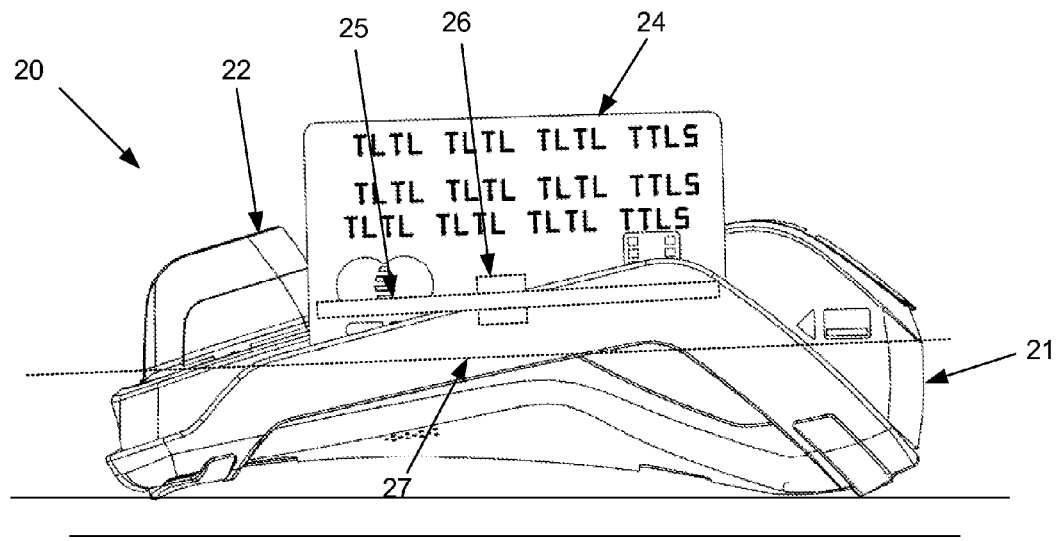
FIG. 4 is a side view of a payment terminal according to the present disclosure.
Figure 5:
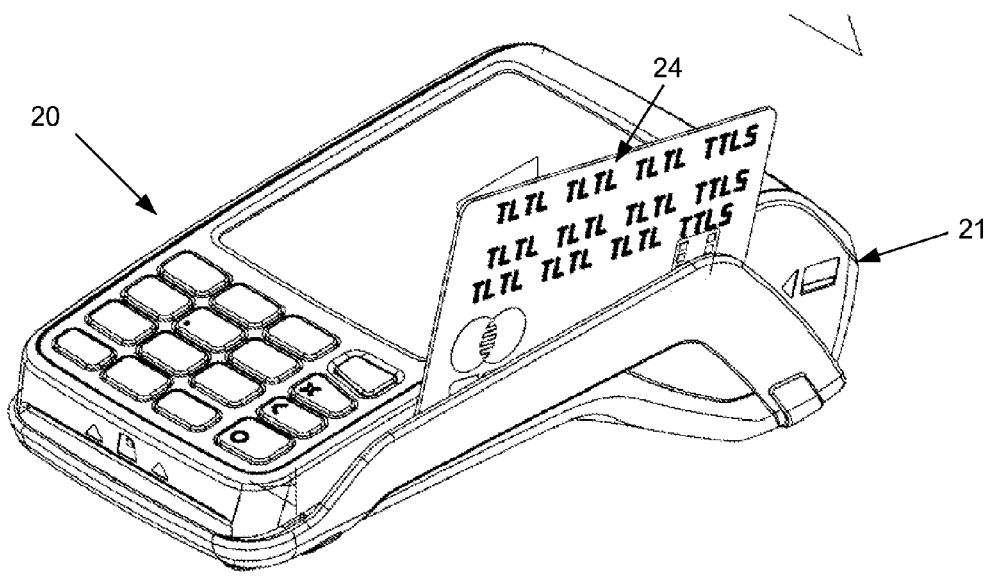
FIG. 5 is an isometric view of a payment terminal according to the present disclosure.

Referring to FIGS. 4 and 5, one embodiment of the technique proposed in the present disclosure is proposed.

A payment terminal (20) is a device comprising, in this example, a rigid casing (for example injected plastic). In this example, the terminal comprises a housing (21) for a paper roll of a printer. It also has a pin-code mask (22). This pin-code mask is used to mask the action of entering a confidential code. In the example described, it is also noted that the housing (21) for a paper roll is used to create an angle of tilt when this roll is placed on a horizontal support. In this example, the tilt of the terminal is about 5° to 15°.

As explained in FIGS. 4 and 5, the card (24) follows a translational motion in a slot (this is a slot of which the two vertical walls are very large so as to ensure the stability of the card and the uniformity of its translational motion). The magnetic tracks of the card (25) can then be read by a magnetic head (26). The card rests on the bottom (27) of the slot. The bottom of the slot is an appreciably plane surface, with a small width (a width slightly greater than the thickness of the card, a thickness that is itself defined in one of the sections of the 7811 standard). Unlike in the prior-art solution, the bottom (27) of this slot is appreciably parallel to the positioning surface or supporting surface of the terminal. In other words, the angle of tilt of the slot is appreciably the opposite of the angle of tilt of the terminal (i.e. about −5° to −15° in this example).

More particularly, the angle between the bottom of the slot and the horizontal positioning surface of the payment terminal is between 0° and 5°. This angle of the bottom of the slot is adapted so as to produce a translational motion that is easy to obtain. More specifically, in the embodiment presented with reference to FIGS. 4 and 5, the angle of the bottom of the slot is about 3°.

Thus, it can be noted that the terminal is tilted (when it is laid down) and this is a definite advantage as described here above. The front face is tilted by angle of about 15° relative to the horizontal positioning surface of the terminal. The positioning of the terminal is necessary (or in any case useful) when the user wishes to pass a magnetic card into it. To facilitate this passage of the magnetic card, the plane of translation of this card before the magnetic head is appreciably parallel to the horizontal positioning surface of the terminal.

Besides, the height of the slot relative to the positioning surface of the terminal is designed so that the fingers that hold the card during its motion of translation do not come into contact with the pin-code mask of the terminal. This makes it possible to preserve a major dimension of the pin-code mask.

Indeed, although this second characteristic is not essential, it makes it possible to respond to another problem related to the dimensions of the pin-code mask: indeed, to prevent the pin-code mask from being ineffective, it should not be too small. One way to prevent the fingers from bumping into the pin-code mask is to reduce its size. With this additional characteristic relative to the height of the slot, the present disclosure avoids the need to reduce the size of the pin-code mask.

This resolves at least the following problems in one or more exemplary embodiments:
- the user does not bump against the pin-code mask (when the terminal is equipped with it) when he slips in the card;
- the distance of the (translational) travel is smaller;
- since the edge of the card is horizontal, the movement is made more easily.

Although the present disclosure has been described with reference to one or more examples, workers skilled in the art will recognize that changes may be made in form and detail without departing from the scope of the disclosure and/or the appended claims.

The invention claimed is:

1. A payment terminal comprising:
   front, rear, and first and second side edges;
   at least one of a keyboard or a terminal screen;
   a slot for inserting a magnetic memory card, which is oriented for translational motion of the magnetic memory card in a direction from the rear edge toward the front edge, the slot having a card insertion plane, which is perpendicular to a plane of a general positioning surface on which the terminal is positioned, and
   a general display plane, which is formed by at least one of the keyboard or the terminal screen, forms a non-zero angle with a general positioning surface of said terminal that tilts at least one of the keyboard or terminal screen toward the front edge, wherein a bottom plane of the insertion slot is substantially parallel to the plane of the general positioning surface on which the terminal is positioned;
   wherein the terminal comprises both the keyboard and the terminal screen, and both the keyboard and the terminal screen form a non-zero angle with the general positioning surface of said terminal, which tilts the keyboard and the terminal screen toward the front edge.

2. The payment terminal according to claim 1, wherein the bottom plane of the insertion slot forms an angle of 0° to 5° with the plane on which the terminal is positioned.

3. The payment terminal according to claim 1, wherein the terminal further comprises a pin-code mask positioned relative to the keyboard or terminal screen and wherein the slot has a height relative to the plane on which the terminal is positioned, which is sufficient so that fingers holding the card during its translational motion within the slot do not come into contact with the pin-code mask of the terminal.

* * * * *